United States Patent [19]
Shouji et al.

[11] Patent Number: 5,668,686
[45] Date of Patent: Sep. 16, 1997

[54] MAGNETO-RESISTIVE READING HEAD WITH REDUCED SIDE-LOBE

[75] Inventors: Shigeru Shouji; Atsushi Toyoda, both of Hamamatsu, Japan

[73] Assignee: Yamaha Corporation, Japan

[21] Appl. No.: 579,928

[22] Filed: Dec. 28, 1995

[30] Foreign Application Priority Data

Dec. 29, 1994 [JP] Japan .................................. 6-340503

[51] Int. Cl.$^6$ ...................................................... G11B 5/39
[52] U.S. Cl. ............................................................ 360/113
[58] Field of Search ................................ 360/113, 110, 360/126; 324/252; 338/32 R

[56] References Cited

U.S. PATENT DOCUMENTS

| | | | |
|---|---|---|---|
| 4,547,824 | 10/1985 | Best et al. | 360/113 |
| 4,713,708 | 12/1987 | Krounbi et al. | 360/113 |
| 4,785,366 | 11/1988 | Krounbi et al. | 360/113 |
| 4,816,948 | 3/1989 | Kamo et al. | 360/113 |
| 4,821,133 | 4/1989 | Mowry et al. | 360/113 |
| 5,140,484 | 8/1992 | Maruyama | 360/113 |
| 5,296,987 | 3/1994 | Anthony et al. | 360/113 |
| 5,327,313 | 7/1994 | Nishioka et al. | 360/113 |
| 5,436,777 | 7/1995 | Soeya et al. | 360/113 |
| 5,471,358 | 11/1995 | Tadokoro et al. | 360/113 |

FOREIGN PATENT DOCUMENTS

| | | | |
|---|---|---|---|
| 5-62130 | 3/1993 | Japan | 360/113 |
| 5135332 | 6/1993 | Japan | 360/113 |
| 5217129 | 8/1993 | Japan | 360/113 |
| 6103536 | 4/1994 | Japan | 360/113 |

OTHER PUBLICATIONS

IEEE Trans. on Magnetics, "Stability & biasing Characteristics of a PM biased SAL/MR Device", Liao et al, vol. 30, No. 6, Nov. 1994.

*Primary Examiner*—Stuart S. Levy
*Assistant Examiner*—David L. Ometz
*Attorney, Agent, or Firm*—Ostrolenk, Faber, Gerb & Soffen, LLP

[57] ABSTRACT

A thin film magnetic head made of material having the magneto-resistance (MR) effect and its manufacturing method are provided. A lower shield layer for magnetically shielding an MR film is formed with a trench of a gull-wing shape having a flat bottom surface and opposite slanted surfaces formed on both sides of the bottom surface. The MR film is formed on the lower shield layer conformal to the gull-wing shape. The region of the MR film on the flat bottom surface forms an effective magnetic active region. A track center shift and the generation of a side-lobe in the off-track characteristic specific to an MR head can be suppressed and high density recording and reproducing of narrow tracks are possible.

11 Claims, 18 Drawing Sheets

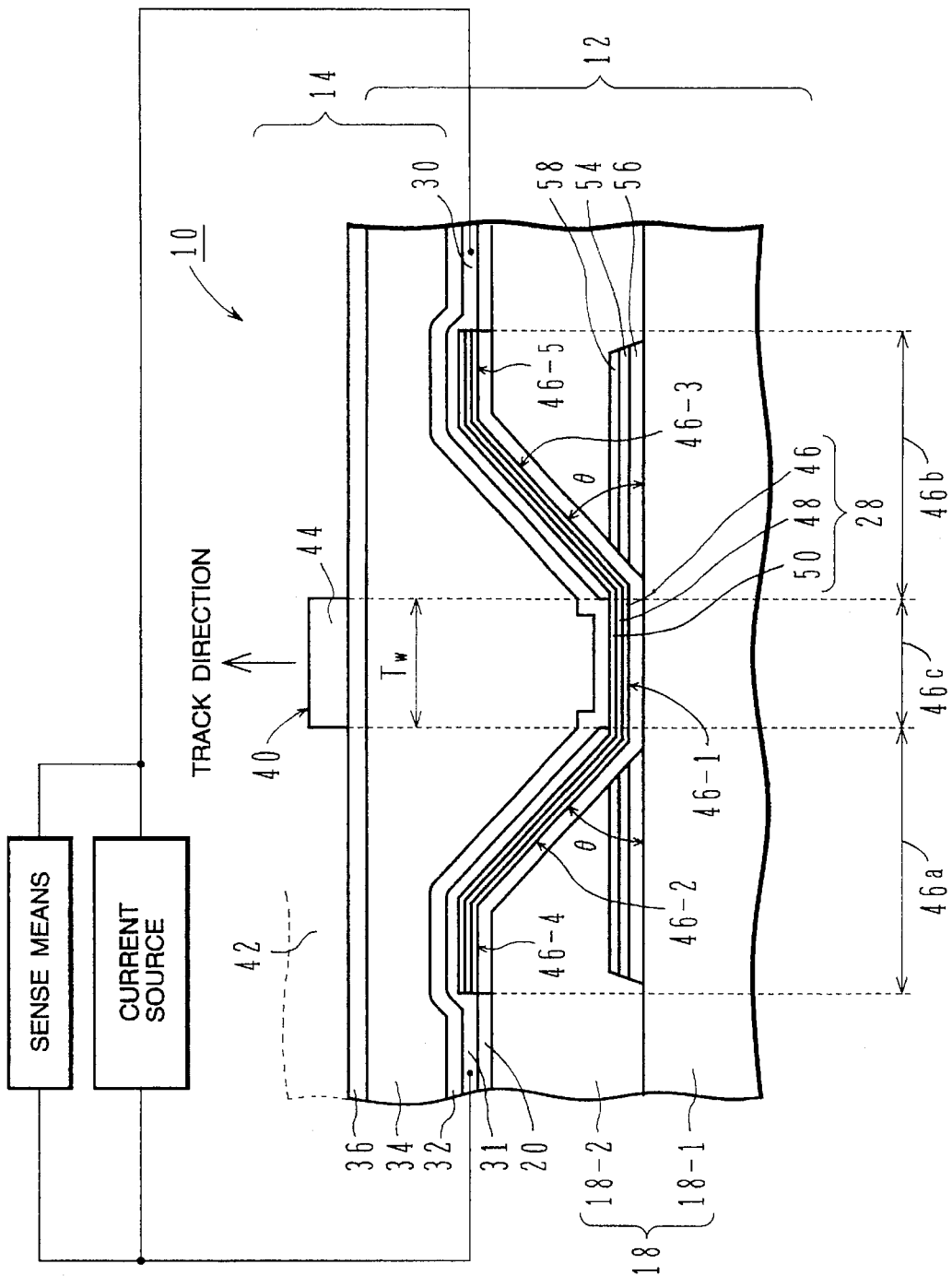

MAGNETO-RESISTIVE READING HEAD WITH REDUCED SIDE-LOBE

BACKGROUND OF THE INVENTION a) Field of the Invention

The present invention relates to a magneto-resistance (MR) reading head used for hard disks or the like, and more particularly to an MR reading head capable of reading data recorded on a narrow track at a high density, by suppressing the generation of a side-lobe which shows an off-track characteristic specific to an MR element, while preventing a sensitivity from being lowered.

b) Description of the Related Art

An MR head is a magnetic head dedicated to reproducing (reading) information recorded on a magnetic recording medium with an MR element by detecting a magnetic field generated from storage magnetic poles in the recording medium. As compared to an induction type magnetic head, an MR head has an advantage in improving a track density and a linear density of recording. Therefore, an induction-MR type composite magnetic head for hard disks is made of a combination of an MR head and, for example, a recording (writing) induction type head.

A conventional induction-MR type composite magnetic head for hard disks is shown in FIGS. 7A and 7B. FIG. 7A is a cross sectional view showing the side elevation of the composite magnetic head, and FIG. 7B is a perspective view thereof as seen from the recording medium plane side. The induction-MR type composite magnetic head 10 is constituted by a lamination of an MR type magnetic head (MR head) 12 and an induction type magnetic head 14 both being formed on a rear end portion of a substrate 16 having a slider surface 24. Both the heads 12 and 14 are manufactured by adopting thin film forming technique.

A lower shield layer 18 of the MR type magnetic head 12 is formed on the slider substrate 16 at its read end portion. The rear end portion of the slider substrate 16 is flat and the lower shield layer 18 is of a flat sheet structure. A lower gap layer 20 of non-magnetic material is laminated upon the lower shield layer 18. A sensor unit 28 is formed on the lower gap layer 20 with its end surface being directed toward a counter surface (slider surface) 24 of a recording medium. The sensor unit 28 is made of an MR film 46, a magnetic spacer layer 48, and a soft adjacent layer (SAL) 50 deposited in this order on the lower gap layer 20 and made flat. As shown in FIG. 7B, on the opposite end portions of the sensor unit 28, leads (lead conductors) 30 and 31 are laminated to establish electrical contacts to the sensor unit. The region of the MR film 46 not overlapped with the leads 30 and 31 is an active region whose resistance is changed by a magnetic field. The region of the MR film 46 overlapped with the leads 30 and 31 is an inactive region whose resistance change cannot be detected because of the high conductivity leads 30 and 31. An upper gap layer 32 of insulating material such as alumina is formed on the sensor unit 28 and leads 30 and 31. An upper shield layer 34 is formed on the upper gap layer 32. The lower and upper shield layers 18 and 34 are formed by depositing soft magnetic material having a high permeability through sputtering, vapor deposition, plating, or the like.

The induction type magnetic head 14 uses the upper shield layer 34 of the MR type magnetic head 12 as its lower core. Sequentially deposited on the upper shield layer 34 are a gap layer 36, a coil 37 buried in an insulating layer 38, an upper core 40, and a protection film 42. The gap layer 36 separates the upper and lower cores 40 and 34 at the lower end as shown in FIG. 7A to form a magnetic gap.

In recording data with the induction-MR type composite magnetic head 10 shown in FIGS. 7A and 7B, a recording current is flowed through the coil 37 of the induction type magnetic head 14 to generate a recording (leakage) magnetic field in the magnetic gap between the upper and lower cores 40 and 34 and record data in a recording medium by this magnetic field. In reproducing data, a predetermined current is flowed through the MR film 46 via the leads 30 and 31 of the MR type magnetic head 12 to magnetically saturate the SAL film 50 and apply a transverse bias magnetic field to the MR film 46 by this saturated magnetic field. A current flowing through the MR film 46 via the leads 30 and 31 is a sense current by which a voltage drop in the MR film 46 generated by a change in an applied magnetic field is detected. As the head 12 traces a track of the recording medium, a voltage across the MR film 46 is modulated by magnetization information on the track so that the recorded data can be detected.

The off-track characteristic of a magnetic head will be explained. FIG. 8A illustrates a read/write operation by a general induction type magnetic head. In a write operation, a signal is written on a track of a recording medium (hard disk) in a pole width Tw of the poles of the upper and lower cores 40 and 34. This written magnetization information is read by the induction type magnetic head. In this case, a maximum reproduction sensitivity is obtained when the poles reach the position just above the track width Tw. As the poles shift in a direction (track width direction) perpendicular to the motion direction of the recording medium, the reproduced output lowers in correspondence with a shift amount of the poles from the track width Tw. FIG. 8B illustrates the off-track characteristic $O_I$. The abscissa represents a lateral shift from the track center, and the ordinate represents a reproduced output voltage In an absolute value. As shown in FIG. 8A, the lateral right shift of the poles is represented by a plus (+) sign, and the lateral left shift is represented by a minus (−) sign.

The off-track characteristic $O_I$ of a general induction type magnetic head shows a maximum sensitivity Vmax when the center of a track width of magnetization information written on a recording medium becomes coincident with the center of the pole width Tw. The reproduction sensitivity Vmax gradually lowers symmetrically with the right and left shifts of the poles, as the poles shift in the track width direction. A reproduction output of the induction magnetic head depends on a speed of the recording medium relative to the head, and is zero when the relative speed is zero.

For reproduction with the MR-induction type composite magnetic head, the MR type magnetic head is used. Since the MR type magnetic head detects a change in magnetic flux density as a change in resistance, it can detect magnetization information independently from a relative speed between the head and magnetic recording medium. FIG. 9 shows an example of the off-track characteristic of an MR type magnetic head. As shown, the off-track characteristic $O_{MR}$ is asymmetric with the track center and has a small bump called a side-lobe. The reason why this side-lobe Is formed will be described with reference to FIGS. 10A to 10EA.

FIGS. 10A to 10E show relative positions of a track 52 written on a recording medium and a MR type magnetic head such as shown in FIGS. 7A and 7B. FIGS. 10AA to 10EA illustrate mechanisms of generating reproduction outputs by the MR type magnetic head at corresponding positions shown in FIGS. 10A to 10E. The relative positions of FIGS. 10A to 10E are shown as cross sections perpendicular to a plane of a recording medium.

An MR film 46 has an easy axis of magnetization in a horizontal direction or longitudinal direction as seen in FIGS. 10A to 10E. Of the MR film 46, the regions (inactive regions) overlapped with the leads 30 and 31 are called lead regions 46a and 46b, and the region between these lead regions is called an active region 46c. As magnetization in the active region 46c changes, a reproduction output changes. The width of the active region 46c is equal to the width of a track 52. It is assumed here that a sense current i flows through the MR film 46 from left to right and a magnetic field is generated upward in the MR film 46. It is also assumed that a magnetization vector of the track is upward.

Current flows through the MR film 46 to magnetically saturate the SAL bias film 50 (FIG. 7B) and this saturated magnetic field applies an upward bias magnetic field to the active region 46c. In order to obtain a maximum sensitivity, the magnetization direction is set about 45 degrees relative to the plane of a magnetic recording medium. Solid lines in the MR film 46 indicate magnetization in the MR film 46 without external magnetization, and broken lines indicate magnetization rotation in the MR film 46 caused by a magnetic field from the track 52.

In FIGS. 10AA to 10EA, a magnetization vector in the MR active region generated by a static bias is indicated by M1, a magnetization vector generated during a reproduction operation is indicated by M2, and the resultant vector is indicated by M3. Namely, the magnetization vector changes from M1 to M3 during the reproduction operation.

The plus (+) sign in the abscissa in FIG. 9 corresponds to a track left shift relative to the active region 46c, and the minus (−) sign corresponds to a track right shift. FIGS. 10A to 10E stand for two minus values, 0, and two plus values.

As shown in FIG. 10A, when the track 52 is at the minus position and under the lead region 46a, magnetization of the lead region 46a is influenced by a magnetic field of the track 52. Therefore, magnetization in the active region 46c receives a clockwise vector as shown in FIG. 10AA. The influence of this clockwise vector becomes larger, the higher the uniaxial anisotropy of the MR film 46.

As shown in FIG. 10B, when the track 52 moves right and rides over the lead region 46a and active region 46c, the magnetic field of the track 52 directly influences the magnetization of the active region 46c and further gives a clockwise vector to the active region 46c as shown in FIG. 10BA. Therefore, a reproduction output further increases.

As shown in FIG. 10C, as the track 52 further moves right to the position coincident with the active region 46c, the direct influence of the track 52 upon the active region 46c becomes maximum. At this time, the influence of the clockwise magnetization vector is strongest and the output is maximum.

As shown in FIG. 10D, as the track 52 further moves right from the track center and rides over the active region 46c and lead region 46b, the magnetic field of the track 52 influences the lead region 46b to rotate the magnetization of the active region in a counter-clockwise direction. Therefore, as shown in FIG. 10DA, the function of clockwise rotation of the magnetization in the active region is cancelled and the reproduction output rapidly lowers. The reproduction output becomes zero when the clockwise magnetization vector in the active region 46c directly influenced by the magnetic field of the track 52 balances just with the counter-clockwise magnetization vector in the active region 46c influenced by the magnetization in the lead region 46b caused by the magnetic field of the track 52.

As shown in FIG. 10E, as the track 52 further moves right and reaches under the right lead region 46c, The magnetic field of the track 52 influences the magnetization in the lead region 46b, and the magnetization in the active region 46c is rotated in the counter-clockwise direction. Therefore, as shown in FIG. 10EA, the magnetization vector is rotated in the counter-clockwise direction and a reproduction output of an opposite phase is generated. This opposite phase output gradually reduces as the track 52 further moves right away from the lead region 46b.

From the above reason, the off-track characteristic becomes asymmetrical as shown in FIG. 9. The narrower the width (track width) of the active region 46c is set, the larger the side lobe SL. If the direction of current is reversed, this relation is also inverted and the side-lobe SL appears on the left side. Such a side-lobe becomes a vital obstacle against a reliable tracking servo and makes it impossible to perform a servo control of a narrow track. High density recording is therefore hindered.

As a method of reducing a side-lobe, it can be considered that magnetization (in the same direction of an anisotropic magnetic field in the MR film 46) of uniaxial anisotropy bias magnet films on the right and left sides of the MR film 46 is made stronger. However, in this case, in order to maintain the direction of magnetization in the MR film 46 at 45°, a bias magnetic field of the SAL bias film 50 is required to be made stronger. Therefore, a change in the direction of magnetization in the MR film 46 with the magnetic field from a recording medium becomes small and the reproduction sensitivity lowers. This is conspicuous particularly for narrow tracks.

SUMMARY OF THE INVENTION

It is an object of the present invention to provide an MR head suitable for high density recording and reproducing data to and from a narrow track and capable of improving the off-track characteristic of an MR element while preventing the sensitivity from being lowered.

According to one aspect of the present invention, there is provided a magneto-resistance type head comprising: a magneto-resistance film including a linear region formed generally in a straight line shape as seen from a counter plane side of a recording medium and a pair of slanted regions disposed on both sides of the linear region, the slanted regions being slanted from the linear region as seen from the counter plane side of the recording medium.

The magneto-resistance (MR) film has the linear region formed generally in a straight line shape and the pair of slanted regions disposed on both sides of the linear region and slanted from the linear region. The slanted regions have therefore an azimuth angle relative to a record signal on a track so that a reproduction sensitivity of the slanted regions lowers considerably. Even if the track moves right and left from the linear region, a magnetic field from the track less influences the slanted regions, and magnetization in the active region is less influenced by the slanted regions. Therefore, the symmetry of the right and left sides of an off-track characteristic can be improved and a side-lobe is reduced. Tracking servo for narrow tracks becomes easy, which realizes high density recording and reproducing. Cross-talk from adjacent tracks reduces. Since a side-lobe is reduced without making a uniaxial anisotropy bias magnetic field strong, the reproduction sensitivity can be prevented from being lowered.

A pair of leads may be connected to the pair of slanted regions.

The slanted regions connected to the leads become the inactive regions. It is therefore possible to detect a record signal on a track without being influenced by the slanted regions.

The pair of leads may be extended from the slanted regions to opposite end portions of the linear region. The pattern size can be set precisely by limiting the area of the active region in the linear region.

A bias permanent magnet for generating a single magnetic domain of the MR film may be formed being disposed on both sides of the linear region and generally flush with the plane of the linear region. This bias permanent magnet 54 suppresses the shape or form anisotropy effect generated at the bent portion between the linear region and slanted regions, and improves the uniaxial anisotropy of the MR element.

According to another aspect of the present invention, there is provided a method of manufacturing a magneto-resistance type head comprising the steps of: forming a lower shield layer on a substrate, the lower shield layer having an upper surface including one bottom surface and a pair of slanted surfaces on both sides of the bottom surface; forming a film of magneto-resistance element material on the upper surface of the lower shield layer; and defining a linear region of the magneto-resistance film on the bottom surface and slanted regions of the magneto-resistance film on the slanted surfaces.

BRIEF DESCRIPTION OF THE DRAWINGS

FIGS. 1A and 1B show an induction-MR type composite magnetic head for hard disks according to an embodiment of the invention, FIG. 1A is a perspective view of the magnetic head as seen from the recording medium counter plane side, and FIG. 1B is a front view of the magnetic head.

FIG. 2A is a schematic cross sectional view illustrating an uneven film thickness and a crevasse of an ASL film when a slanted angle θ is set too large, and FIGS. 2B and 2C are schematic cross sectional views showing an example of the processes of patterning resist and forming lead films.

FIG. 4A is a graph showing the relationship between an azimuth angle and a reproduction output, and FIG. 4B is a graph showing an off-track characteristic.

DETAILED DESCRIPTION OF THE PREFERRED EMBODIMENTS

In this application, the following conditions or definitions are adopted.

(1) A transverse bias field is applied so as to bias a magneto-resistance (MR) material so that its response to a magnetic flux field is linear. The transverse bias field is generally normal to the plane of the magnetic media and parallel to the surface of a planar MR element. The transverse bias field is provided by a current flow through a layer of soft magnetic material formed adjacent to the MR element and separated by a thin electrically insulating layer.

(2) A longitudinal bias field is applied so as to make magnetic domain of the MR material single so that Barkhausen noise caused by multi-domain activities in the MR material is suppressed. The longitudinal bias field extends parallel to the surface of the magnetic media and parallel to the lengthwise direction of the MR element. The longitudinal direction is provided by hard magnet or exchange coupling bias.

Figure 1A:
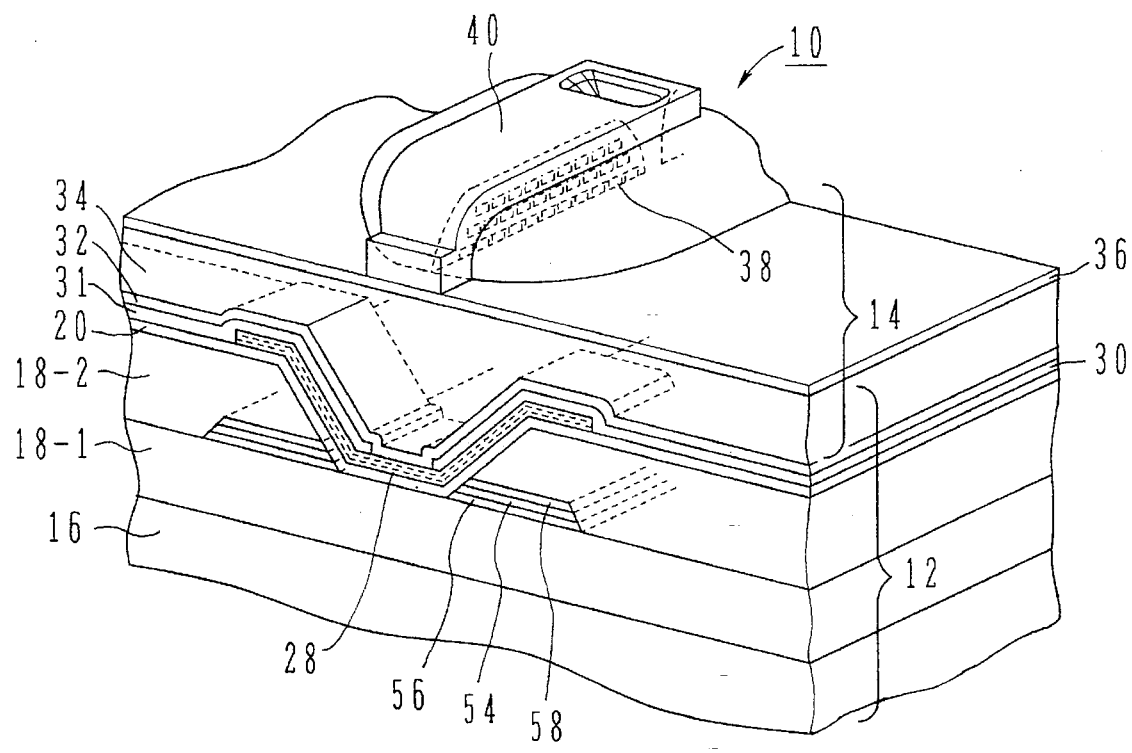

An MR head according to an embodiment of the invention is shown in FIGS. 1A and 1B. The MR head is combined with an induction type magnetic head to form an induction-MR type composite magnetic head for hard disks. FIG. 1A is a perspective view of the composite magnetic head as seen from a recording medium counter plane side, and FIG. 1B is a front view of the magnetic head. The induction-MR type composite magnetic head 10 is formed by a laminate of an MR type magnetic head (MR head) 12 and an induction type magnetic head 14 stacked in this order on a ceramic slider substrate 16 of $Al_2O_3$—TiC at its rear end portion. Both the heads 12 and 14 are formed by adopting thin film forming technique.

In the MR type magnetic head 12, a lower shield layer 18 is formed on the slider substrate 16 at its rear end portion, the lower shield layer 18 being a laminate of two lower shield sub-layers 18-1 and 18-2 of soft magnetic material such as permalloy (NiFe) and Sendust. Of the two lower shield sub-layers, the upper side lower shield sub-layer 18-2 is trenched to have an inverted trapezoid cross section. On the lower shield layer 18, a lower gap layer 20 of insulating material is deposited conformal to the inverted trapezoid shape. On this lower gap layer 20, a sensor unit 28 is formed which is a laminate of an MR film (MR element) 46 such as NiFe, a magnetic spacer layer 48 such as Ti, and an SAL bias film 50 of CoZrM (M is Nb, or Mo). The MR film 46 has a bottom flat region 46-1, opposite slanted regions 46-2 and 46-3, and outside upper flat regions 46-4 and 46-5, respectively in conformity with underlying topology. The slanted regions 46-2 and 46-3 are contiguous with the bottom flat region 46-1 and outside upper flat regions 46-4 and 46-5. The MR film 46 has a gull-wing shape as seen from the front of a magnetic recording medium. The bottom flat region is disposed generally parallel to a magnetization transition boundary line of a signal recorded on a track during a reproduction operation (in other words, generally parallel to a write gap 36), and has a generally linear cross section. Therefore, the bottom flat region is hereinafter called a linear region 46-1. The opposite slanted regions are inclined at the opposite sides of the linear region 46-1 by an angle θ relative to a line extended from the linear region 46-1 (i.e., relative to a magnetization transition boundary line of a signal recorded on a track). Therefore, the opposite slanted regions are hereinafter called slanted regions 46-2 and 46-3. The opposite upper flat regions are formed on the top surface of the lower shield layer 18 outward of the slanted regions, and called hereinafter outer peripheral regions 46-4 and 46-5. Although the spacer layer 48 and SAL bias layer 50 have the structure similar to the MR film 46, the following description is directed mainly to the MR film 46 because the essential element is the MR film 46.

The angle θ of the slanted regions 46-2 and 46-3 relative to a line extended from the bottom plane of the linear region is preferably about 20°<θ< about 75°.

Figure 2A:
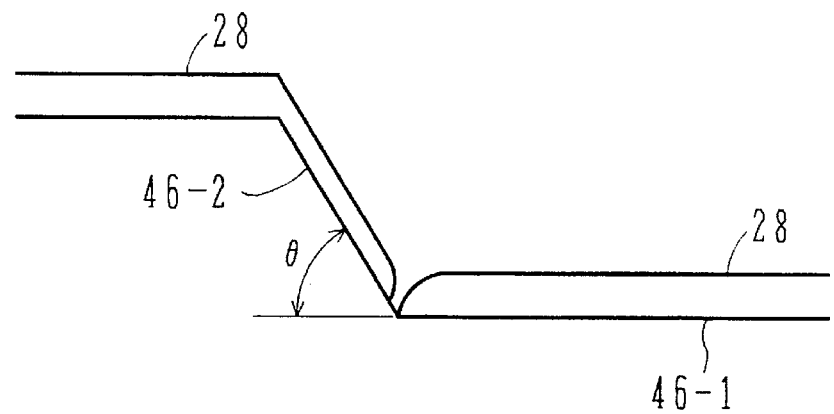
FIGS. 2A to 2C are diagrams illustrating the embodiment shown in FIGS. 1A and 1B.

A larger angle θ gives a larger azimuth effect to be described layer. However, if the angle θ is too large, the film thickness of the sensor unit 28 formed by sputtering or the like becomes thin at the slanted region 46-2 (46-3) as shown in FIG. 2A. Furthermore, a crevasse is likely to be formed in the sensor unit 28 at a boundary area (bent area) between the slanted regions 46-2 and 46-3 and linear region 46-1, and an electrical conduction is lost at the worst. Therefore, in order to deposit the sensor unit 28 uniformly and avoid such a crevasse, the upper limit of the angle θ is preferably about 75°.

On the other hand, if the angle θ is too small, the boundary between the slanted regions 46-2 and 46-3 and linear region 46-1 becomes vague, and the azimuth effect is lowered. The lower limit of the angle θ is therefore preferably about 20°.

A fixed bias permanent magnet (uniaxial anisotropy bias magnet film) 54 for generating a longitudinal bias field so that a single magnetic domain is formed between the two lower shield sub-layers 18-1 and 18-2. The permanent magnet 54 is sandwiched between magnetic spacer layers 56 and 58, and deposited on both sides of the linear region 46-1 of the MR film 46, being generally flush with the plane of the linear region 46-1. This bias permanent magnet 54 for generating a single magnetic domain suppresses the shape or form anisotropy effect generated at the bent portion (boundary portion) between the linear region 46-1 and slanted regions 46-2 and 46-3 of the MR film 46, and improves the uniaxial anisotropy of the MR film 46. The bias permanent magnet 54 for generating a single magnetic domain is magnetized in a direction parallel to the track width of the MR film 46 (in the easy axis direction of magnetization of the MR film 46). The slanted regions 46-2 and 46-3 of the MR film 46 extend in the track width direction over the fixed bias magnet 54.

The plan shape of the sensor unit may be a converging shape toward the both ends as proposed in the U.S. patent application Ser. No. 08/497,388 filed on Jun. 30, 1995, which is incorporated therein by reference.

On the sensor unit 28, leads 30 and 31 are formed extending from the opposite end portions of the linear region 46-1 slightly before the slanted regions 46-2 and 46-3 (therefore, the leads 30 and 31 are laid on the boundary between the linear region 46-1 and the slanted regions 46-2 and 46-3), over the slanted regions 46-2 and 46-3 and outer peripheral regions 46-4 and 46-5. Of the MR film 46, the linear region (more precisely, the partial region of the linear region between the leads 30 and 31) 36-1 forms the active region 46c, and the slanted regions 46-2 and 46-3 and outer peripheral regions 46-4 and 46-5 formed with the leads forms lead regions 46a and 46b (inactive regions).

Figure 2B:
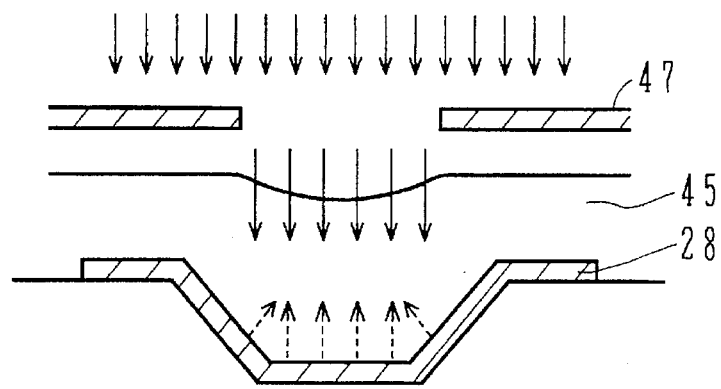
Figure 2C:
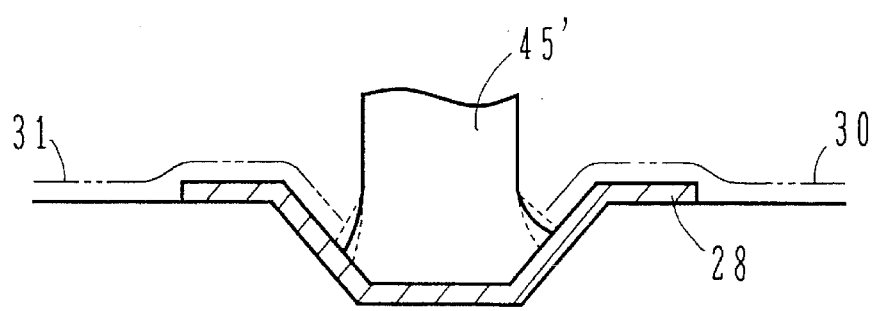

The reason of forming the leads not only on the slanted regions 46-2 and 46-3 but also slightly on the linear region 46-1 is as follows. In forming lead films 30 and 31 on the sensor unit 28, a negative resist layer 45 is deposited, exposed via a mask 47, and developed as illustrated in FIG. 2B. Resist 45' exposed with exposure light is left as shown in FIG. 2C. A lead material film is deposited to form the leads 30 and 31 through lift-off. If the resist layer 45 is patterned at the slanted regions 46-2 and 46-3 or at the boundary area between the linear region 46-1 and slanted regions 46-2 and 46-3, it is difficult to form a vertical side wall of the resist layer 45 because of unexpected light reflected from the slanted regions 46-2 and 46-3. It is therefore difficult to define the track width with high precision. The effect of light reflected from the slanted regions becomes large if positive resist is used. Even if a lead layer is deposited and thereafter a resist mask is formed to etch the lead layer, the pattern precision is also likely to be lowered because of the slanted regions.

If the resist layer 45 is patterned at the linear region 46-1 away from the slanted regions 46-2 and 46-3, the effect of light reflected from the slanted regions can be reduced. Therefore, the position of the resist side wall can be controlled precisely and the track width is defined with high precision. It is not preferable to give any reproduction sensitivity at the slanted regions 46-2 and 46-3, because noises generated by detecting an unnecessary signal may superpose on an original signal. It is preferable to give a reproduction sensitivity of an original signal only to the linear region. If the leads 30 and 31 are formed slightly on the linear region 46-1, the adverse effect by the slanted regions 46-2 and 46-3 can be reduced. From the above reason, in the embodiment shown in FIGS. 1A and 1B, the width (Tw) of the active region 46c is set a little narrower than the whole width of the linear region 46-1.

On the sensor unit 28 and leads 30 and 31, an upper gap layer 32 of insulating material such as alumina is formed. On the upper gap layer 32, an upper shield layer 34 of the same materials as the lower shield layer is formed. A pair of these shield layers 18 and 34 sandwiches the MR film 46 to prevent magnetic fluxes from an undesired area from passing through the MR film 46.

The induction type magnetic head 14 uses the upper shield layer 34 of the MR type magnetic head 12 as its lower core. On this lower core, a write gap layer 36, a coil 37 buried in an insulating layer 38, an upper core 40, and a protection film 42 are sequentially stacked.

In recording data by the induction-MR type composite magnetic head 10 shown in FIGS. 1A and 1B, a recording current is flowed through the coil 37 of the induction type magnetic head 14 to generate leakage fluxes in the magnetic gap between the upper and lower cores 40 and 34 and record data in a recording medium by this magnetic field. In reproducing data, a current is flowed from a current source through the MR film 46 via the leads 30 and 31 of the MR type magnetic head 12 to magnetically saturate the SAL film 50 and apply a transverse bias field to the MR film 46 by this saturated magnetic field. While a constant current is flowed through the MR film 46 via the leads 30 and 31, a voltage across the leads 30 and 31 is detected by a sense means while tracing a track on a recording medium. A voltage across the MR film 46 is modulated in accordance with the data written in the track so that a reproduction signal is obtained. A track width Tw written by the induction type magnetic head 14 is defined by the pole width of the upper core 40. The width (distance between the leads 30 and 31) of the active region 46c of the MR film 46 is set generally equal to the track width Tw.

Figure 3:
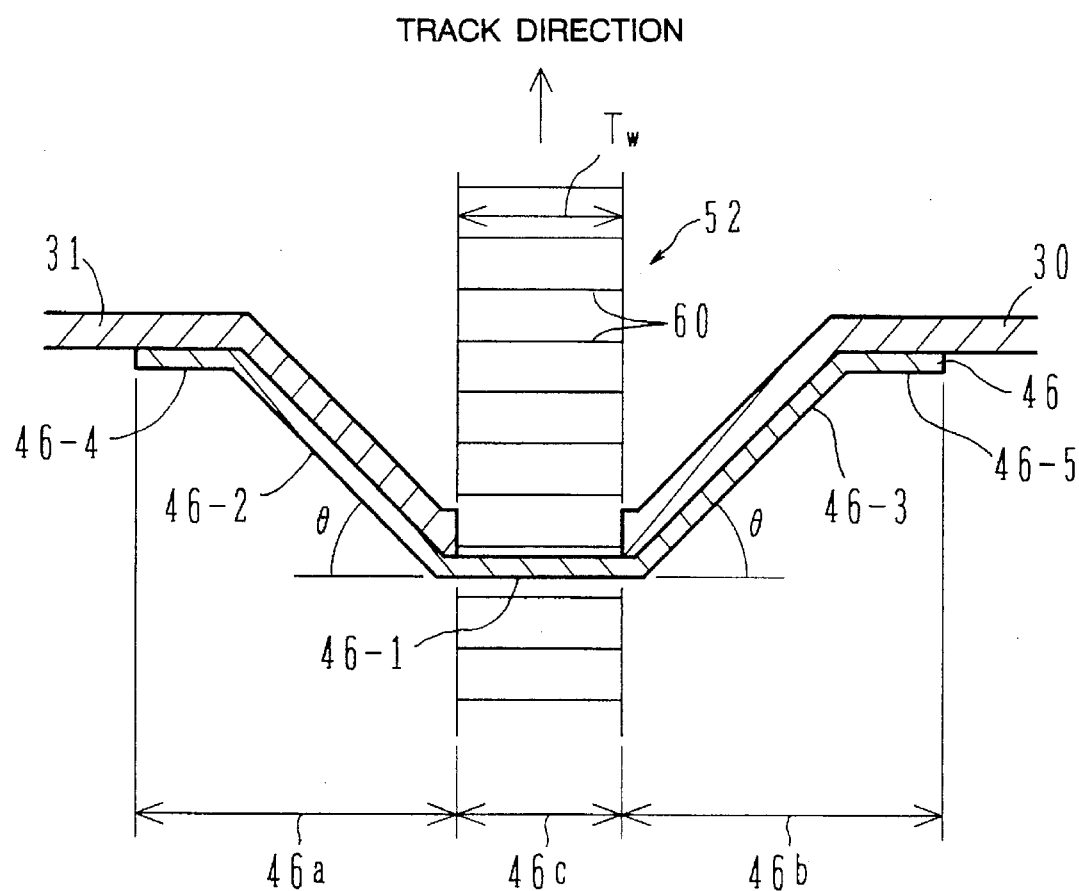
FIG. 3 is a plan view illustrating a reproduction operation by the MR film shown in FIGS. 1A and 1B.

In the reproducing operation by the induction-MR type composite magnetic head 10 constructed as above, as shown in FIG. 3, the active region 46c of the MR film 46 traces the track in parallel to (at an azimuth angle of 0°) the magnetization transition boundary line 60 of a record signal on the track 52. The slanted regions 46-2 and 46-3 constituted by the lead regions 46a and 46b have an azimuth angle θ (for example, about 40°) relative to the magnetization transition boundary line 60 of a record signal.

Figure 4A:
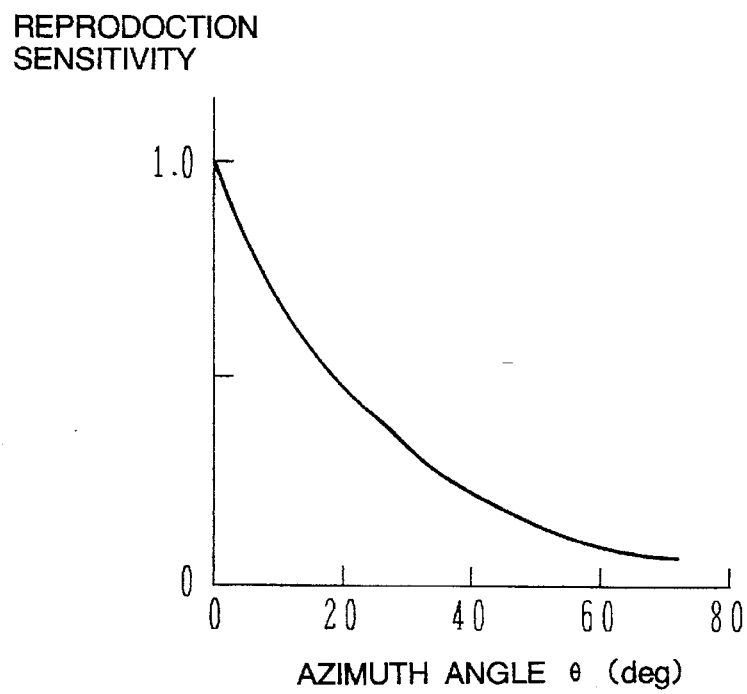
FIGS. 4A and 4B are graphs showing the characteristic of an MR type magnetic head.
Figure 4B:
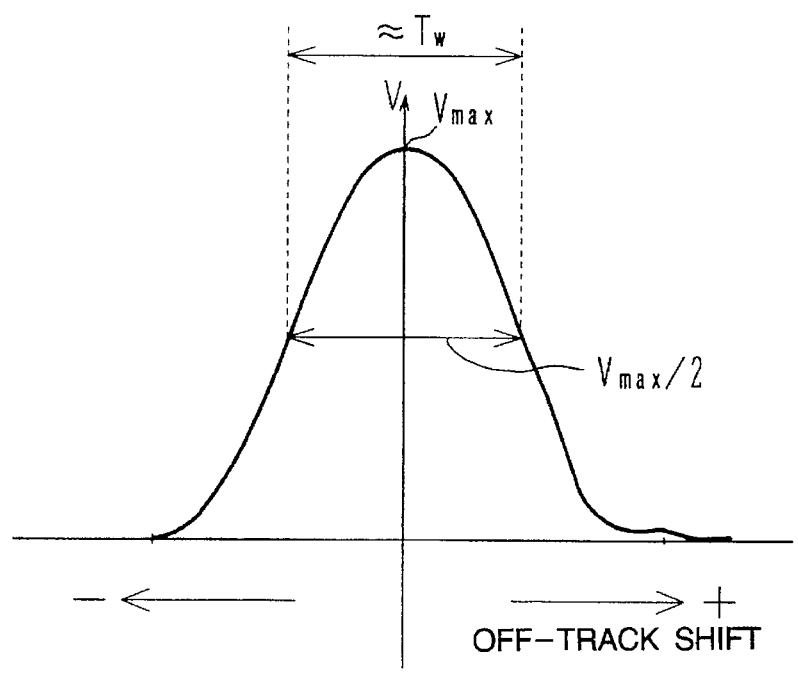

FIG. 4A is a graph showing the experiment result regarding the relationship between an azimuth angle θ of an MR element and a reproduction output at a track width of 1.5 μm and at a record density of 70 kilobits per inch. As the azimuth angle increases from 0°, the reproduction sensitivity quickly lowers. At the azimuth angle θ of about 20°, the reproduction sensitivity is approximately halved, and at the azimuth angle θ of about 40°, the reproduction output lowers to about one fourth that at the azimuth angle θ of 0° and to one tenth or lower than that at about 75°. Therefore, the active region 46c of the MR film 46 shown in FIGS. 1A and 1B has a high sensitivity of a track record signal as conventional, and the amount of signals picked up from the lead regions 46a and 46b can be reduced considerably. As a result, even If the track 52 shifts right and left from the active region 46c, the influence of signals picked up from the region other than the active region 46c can be reduced and the shift of maximum sensitivity from the center of the track or the generation of a side-lobe can be suppressed as shown In the off-track characteristic shown in FIG. 4B. Tracking servo for a narrow track is therefore possible, and high density recording/reproduction can be realized. Cross-talk from adjacent tracks can also be reduced.

Although the peripheral regions 46-4 and 46-5 outward of the lead regions 46a and 46b are parallel to the magnetization transition boundary line 60 of a record signal, the outer peripheral regions 46-4 and 45-5 give almost no influence to the reproduction output because they are far from the active region 46c.

The method of manufacturing the induction-MR type composite magnetic head 10 shown in FIGS. 1A and 1B will be described with reference to FIGS. 5A to 5L.

Figure 5A:
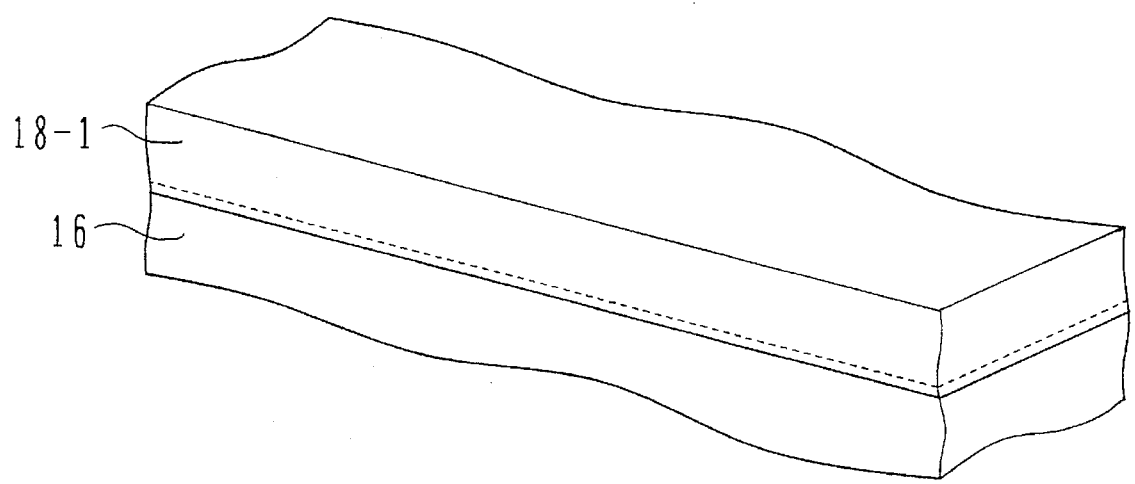
FIGS. 5A to 5L are cross sectional views illustrating the processes of manufacturing an induction-MR type composite magnetic head according to an embodiment of the invention.

As shown in FIG. 5A, on a substrate 16 made of ceramic material such as $Al_2O_3$—TiC or other materials, a protection film such as alumina ($Al_2O_3$) is formed. On the protection film, a lower side lower shield sub-layer 18-1 is formed. The lower side lower shield sub-layer 18-1 is formed on the protection film by depositing soft magnetic material such as permalloy (NiFe) and Sendust through sputtering, vapor deposition, plating, or the like.

Figure 5B:
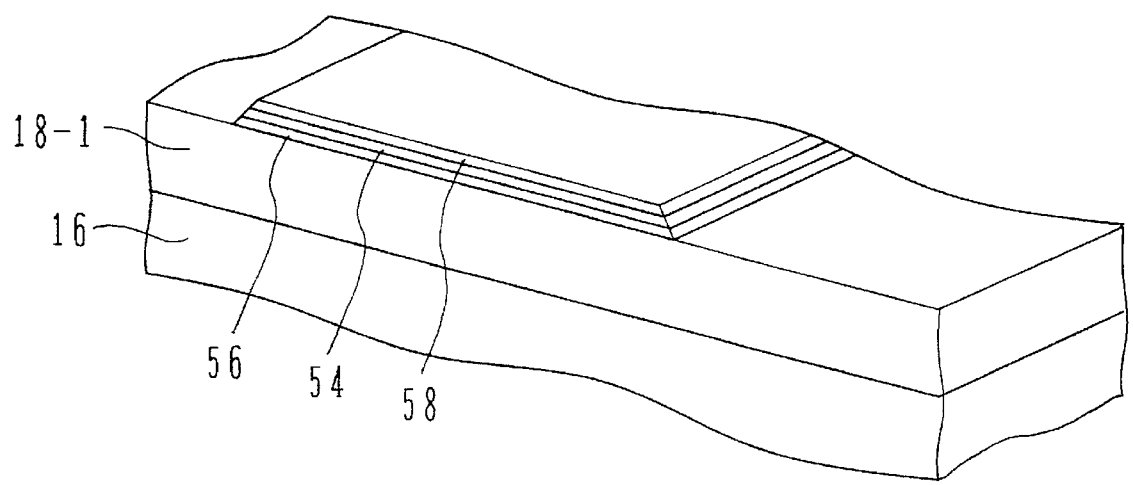

As shown in FIG. 5B, on the lower side lower shield sub-layer 18-1, a magnetic spacer layer 56 such as alumina, a bias permanent magnet 54 for generating a single magnetic domain, and a magnetic space layer 58 such as alumina are laminated in this order, and patterned in a rectangular shape.

Figure 5C:
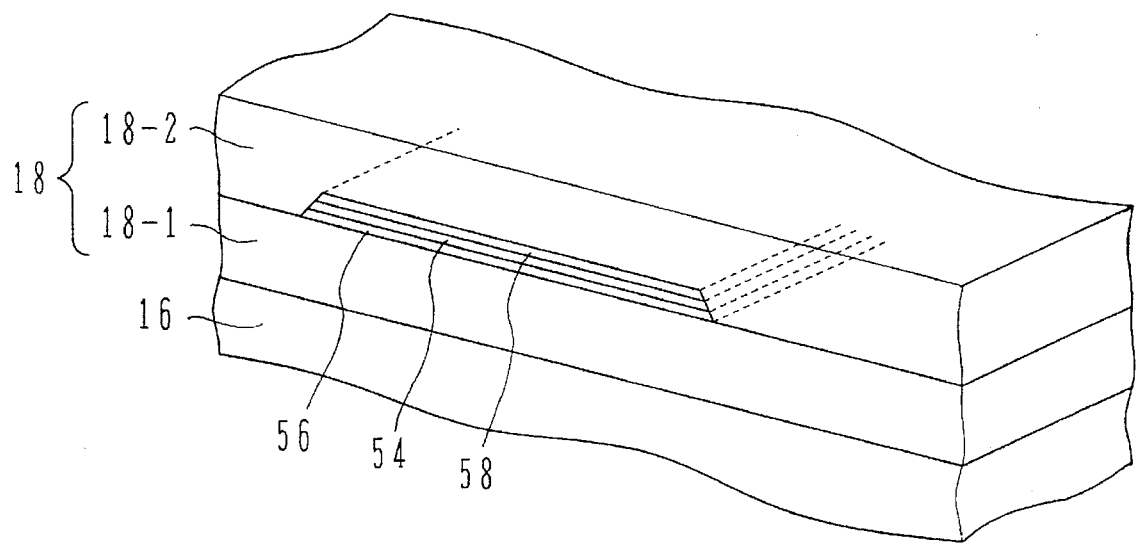

As shown in FIG. 5C, an upper side lower shield sub-layer 18-2 is formed over the substrate by using the same material as the lower side lower shield sub-layer 18-1. With the above processes, the bias permanent magnet 54 for generating a single magnetic domain and the magnetic spacers 56 and 58 are disposed and embedded in the lower shield layer 18.

Figure 5D:
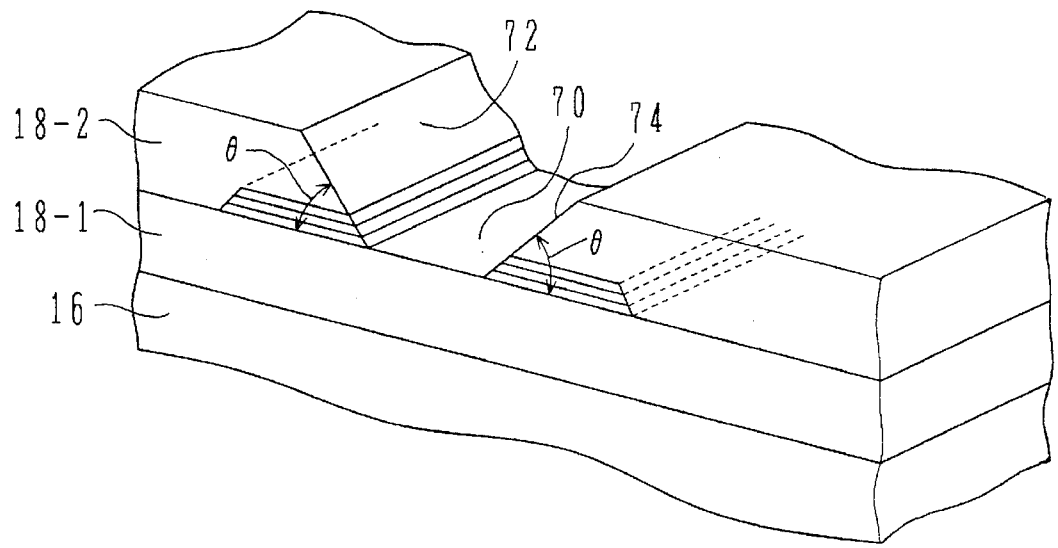
Figure 6A:
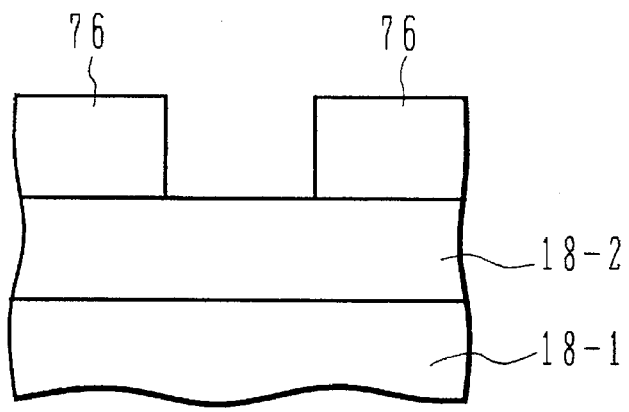
FIGS. 6A to 6C are cross sectional views illustrating the details of an example of the trenching process illustrated in FIG. 5D.
Figure 6B:
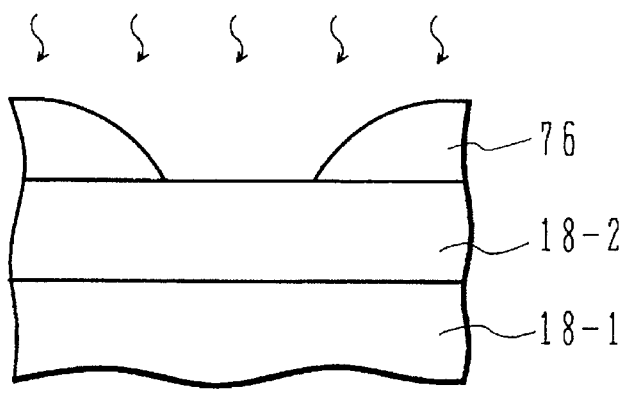
Figure 6C:
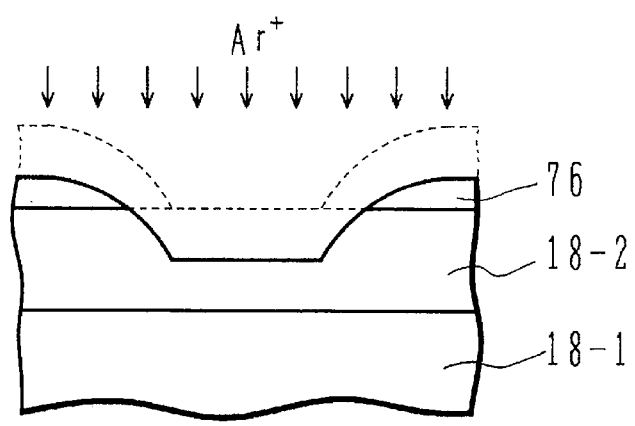
Figure 7A:
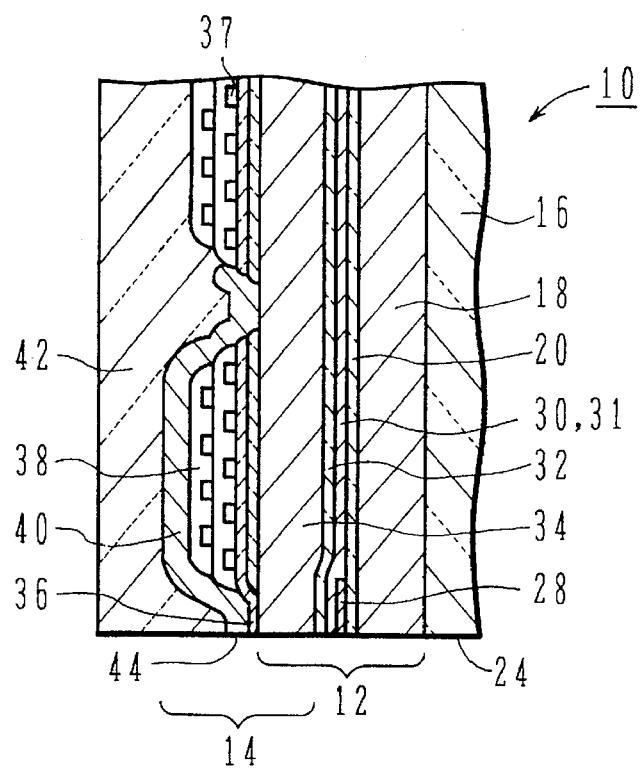
FIGS. 7A and 7B are a cross sectional view of a conventional induction-MR type composite magnetic head for hard disks and a perspective view of the magnetic head as seen from the recording medium counter plane side.
Figure 7B:
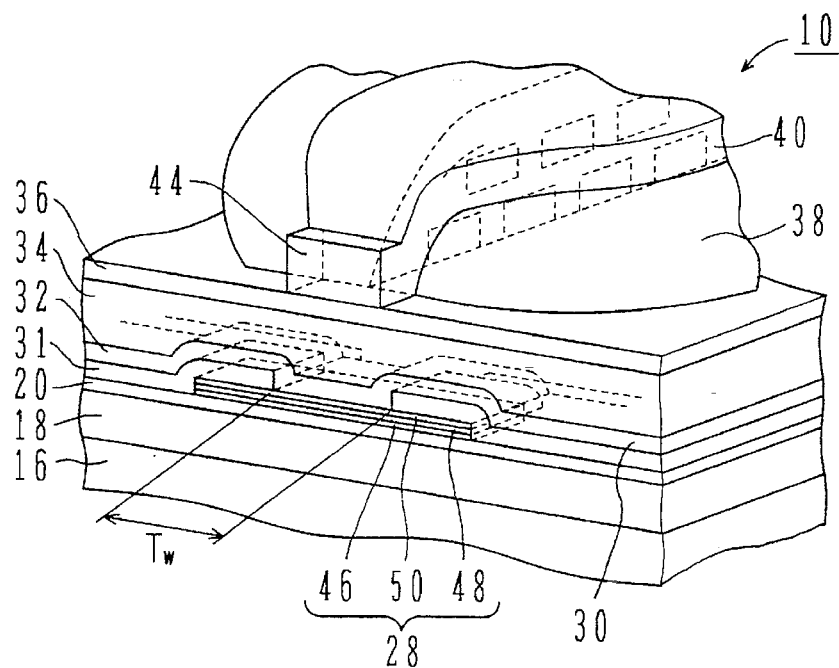
Figure 8A:
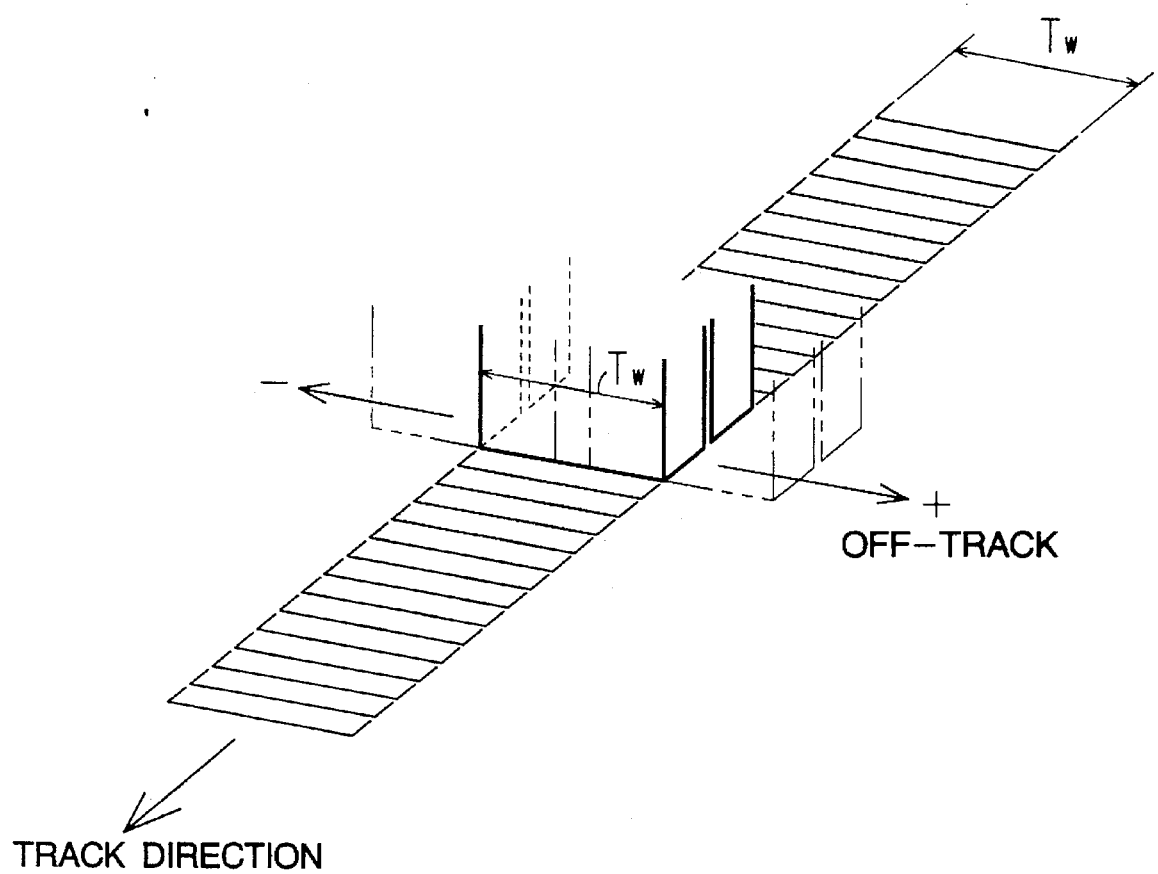
FIGS. 8A and 8B are a perspective view illustrating a read/write operation by an induction type magnetic head and a graph showing the off-track characteristic.
Figure 8B:
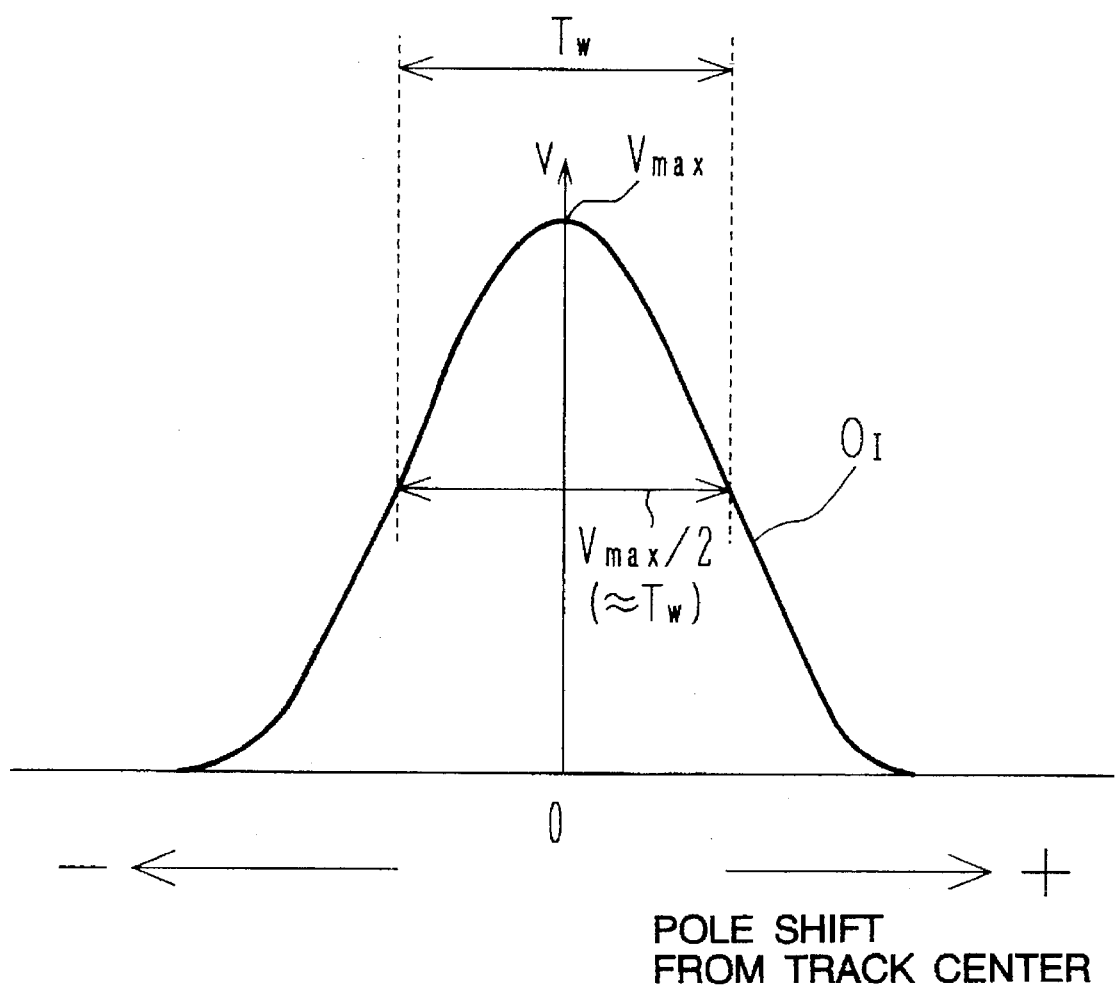
Figure 9:
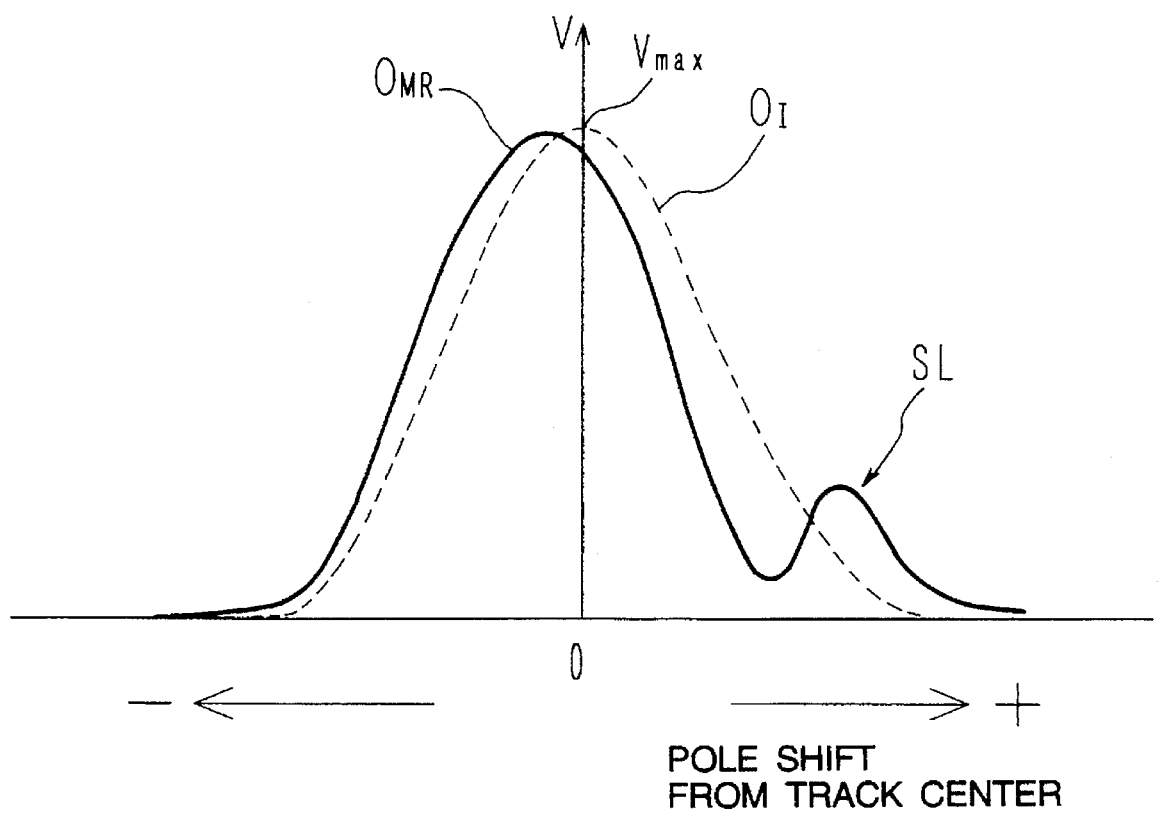
FIG. 9 is a graph showing the off-track characteristic of a conventional MR type magnetic head.
Figure 10A:
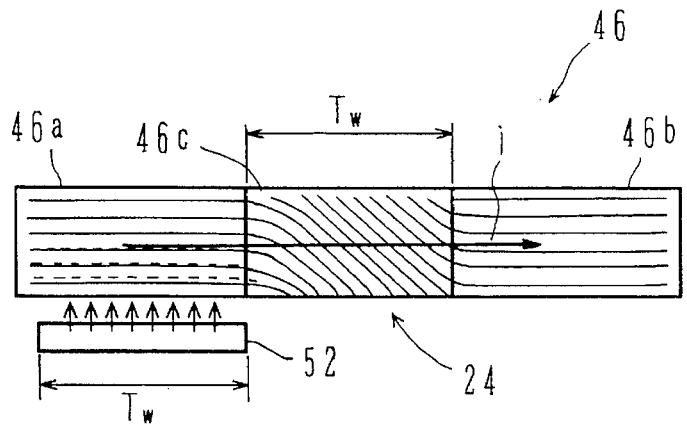
FIGS. 10A to 10E, and 10AA to 10EA illustrate the reason why a conventional MR type magnetic head has the off-track characteristic shown in FIG. 9, FIGS. 10A to 10E are schematic cross sectional views showing relative positions of a track written on a recording medium and an MR film, and FIGS. 10AA to 10EA are vector diagrams illustrating synthesis of reproduction output components.
Figure 10A:
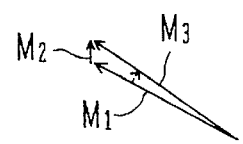
Figure 10B:
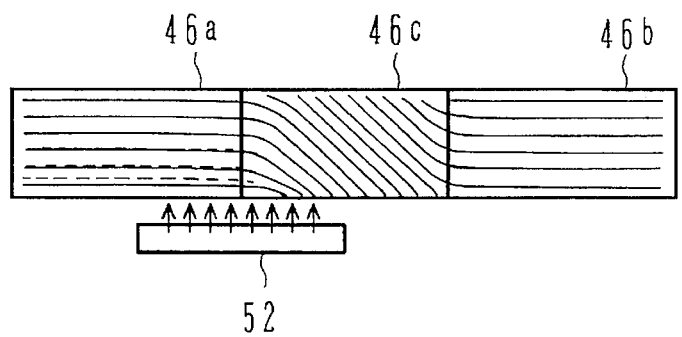
Figure 10B:
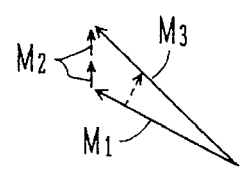
Figure 10C:
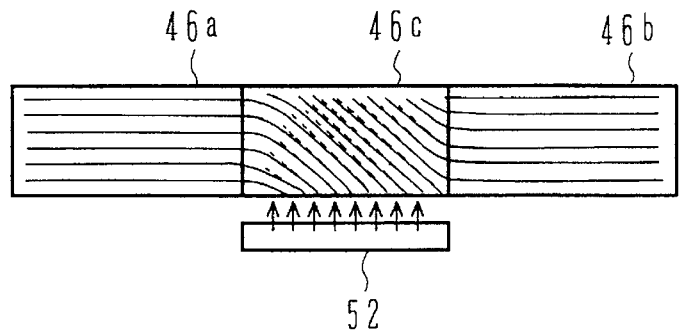
Figure 10C:
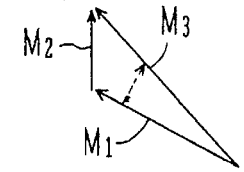
Figure 10D:
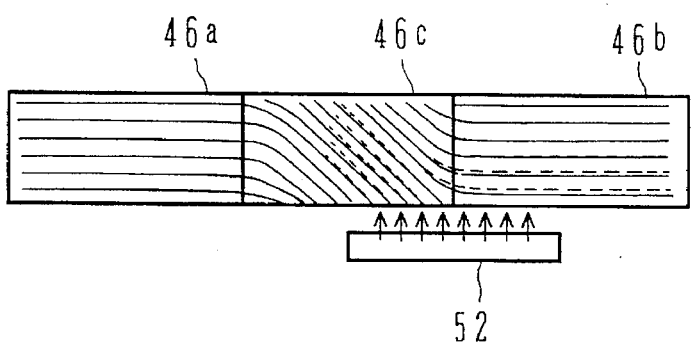
Figure 10D:
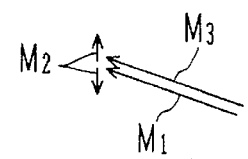
Figure 10E:
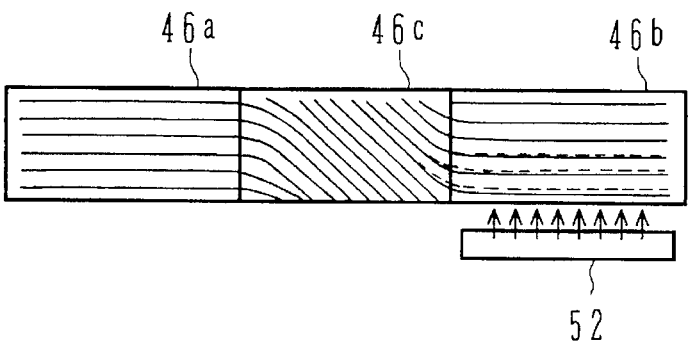
Figure 10E:
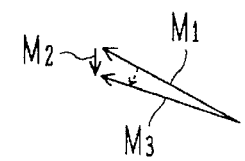

As shown in FIG. 5D, the upper side lower shield sub-layer 18-2, magnetic spacer layer 58, bias permanent magnet 54 for generating a single magnetic domain, and magnetic spacer layer 56 are trenched to form an inverted trapezoid structure having one bottom surface 70 and opposite side slanted surfaces 72 and 74. An example of the trenching process is illustrated in FIGS. 6A to 6C. As shown in FIG. 6A, on the upper side lower shield sub-layer 18-2, a resist layer 76 is coated, exposed, and developed to pattern it. As shown in FIG. 6B, the resist pattern 76 is heated to reflow it. Then, as shown in FIG. 6C, the substrate is milled (etched) by ion etching or the like using argon ions or other ions.

Figure 5E:
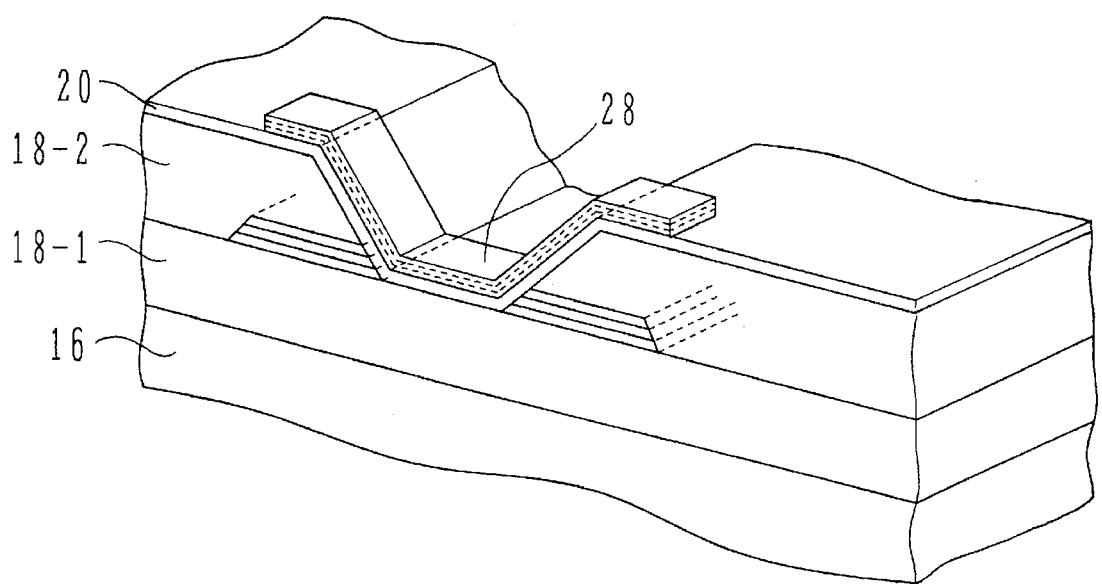

As shown in FIG. 5E, on the surface of the trenched substrate, gap material such as alumina is deposited by sputtering or the like to form a lower gap layer 20. On the lower gap layer 20, an MR film 46 (NiFe or other materials), a magnetic spacer layer 48 (T1 or other materials), and an SAL bias film 50 (CoZrM where M is Nb, Mo, or other elements, or other materials) are laminated. This lamination is patterned into a rectangular shape to form a sensor unit 28. An easy axis of magnetization is formed in the longitudinal direction (in the direction parallel to the plane of a recording medium) in the MR film 46.

Figure 5F:
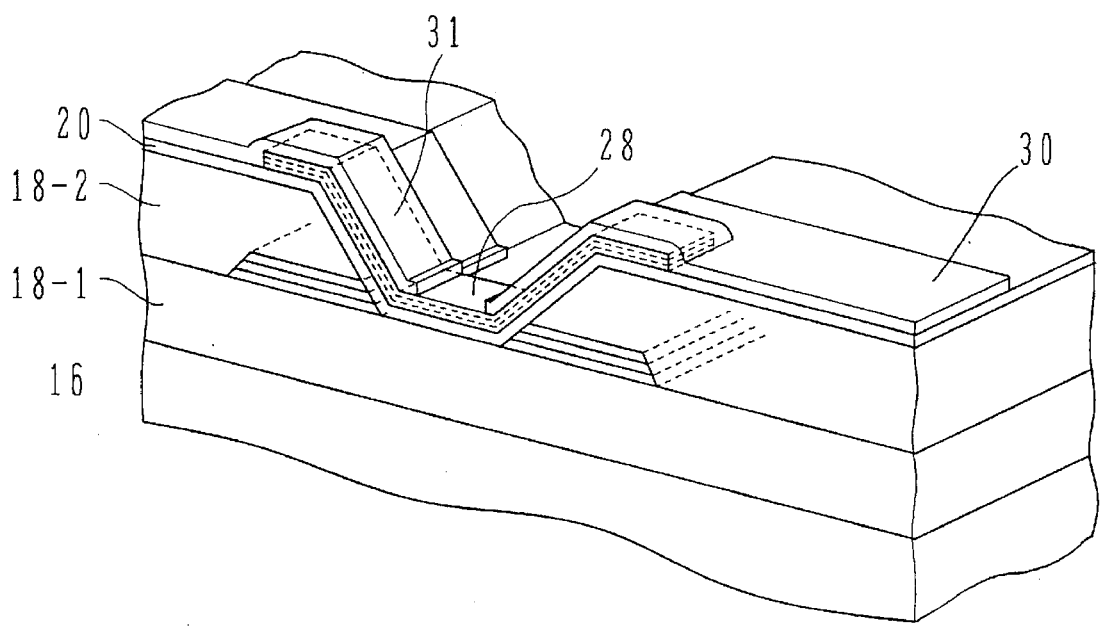

As shown in FIG. 5F, on the sensor unit 28, a lead film (W, Ta, or other metals) of a high conductivity is formed for the electrodes of the sensor unit 28. The lead layer on the bottom surface of the sensor unit 28 except the opposite end portions is removed through photolithography to form leads 30 and 31 on the opposite sides of the sensor unit 28. For forming the lead film, sputtering, plating, vapor deposition, or other processes may be used.

Figure 5G:
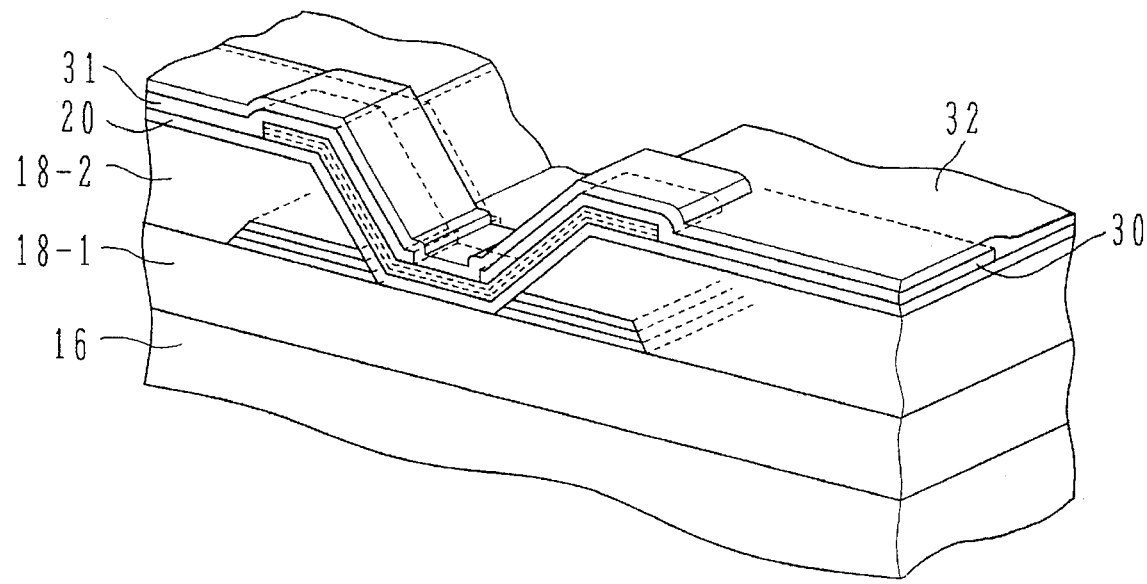

As shown in FIG. 5G, on the leads 30 and 31, an upper gap layer 32 (inorganic insulating material such as alumina) is formed.

Figure 5H:
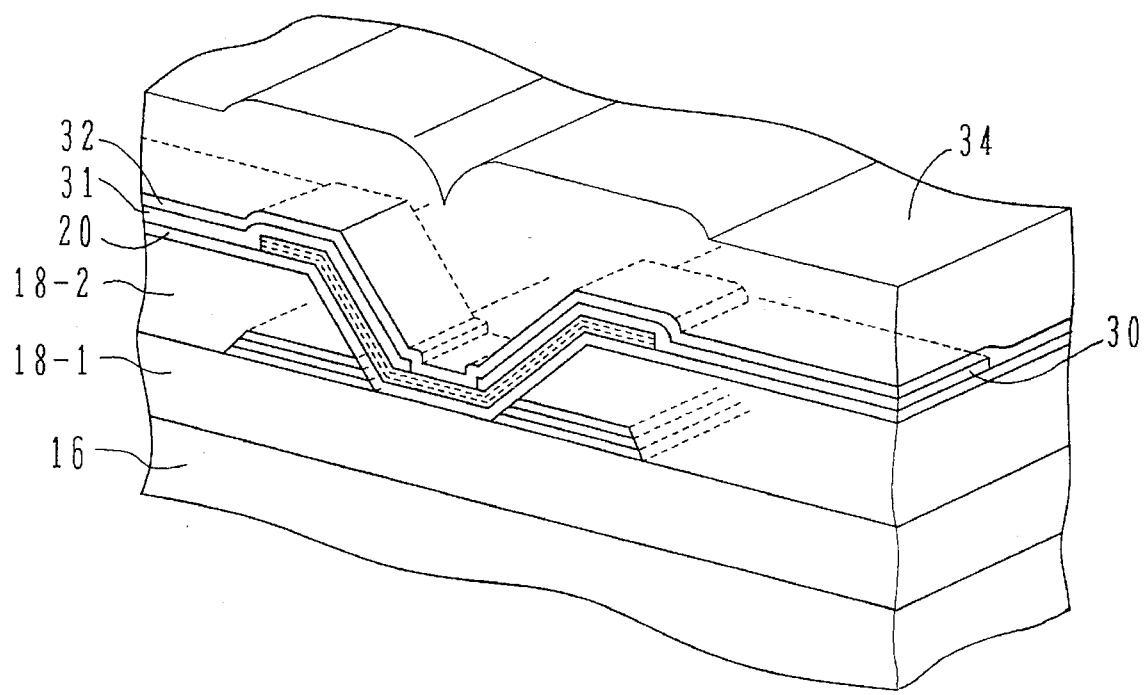

As shown in FIG. 5H, a soft magnetic film (NiFe, Sendust, or the like) is formed by vapor deposition, sputtering, or other processes to form an upper shield layer 34 which is also used as the lower core of the write head.

Figure 5I:
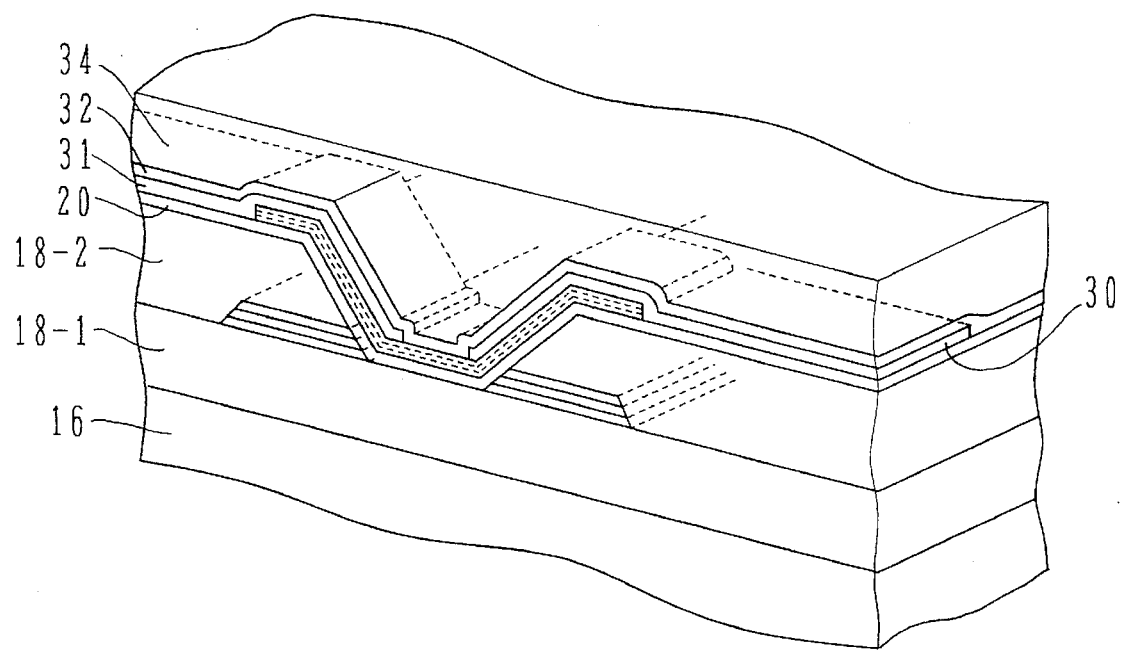

As shown in FIG. 5I, the surface of the upper shield layer—lower core 34 is mechanically lapped to make it flat.

Figure 5J:
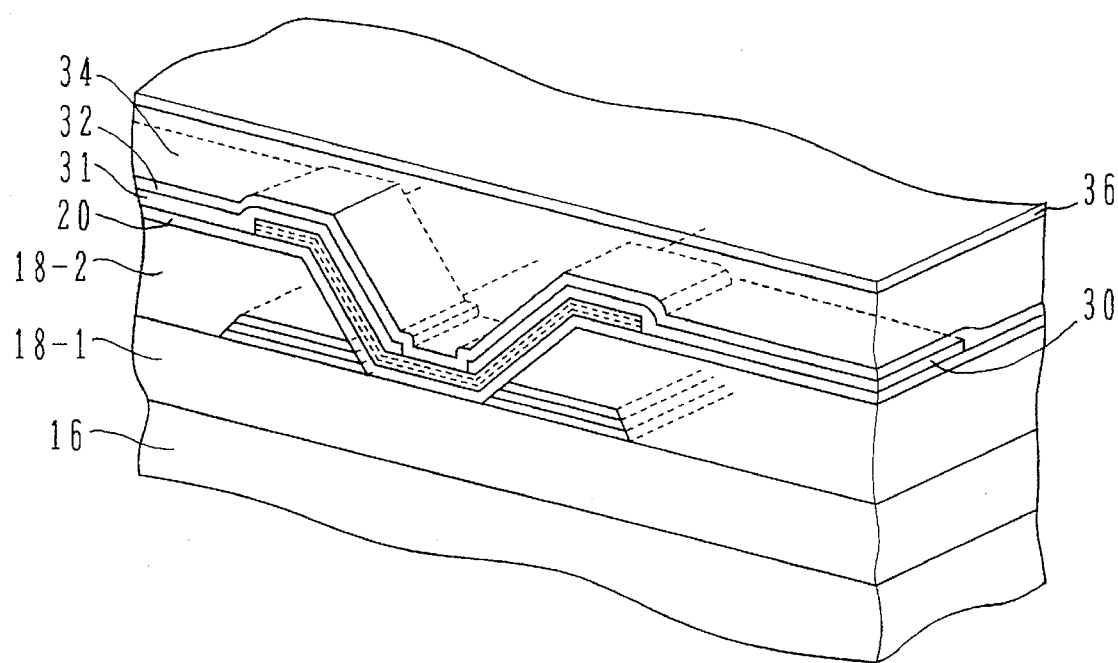

As shown in FIG. 5J, on the upper shield layer—lower core 34, a write gap layer 36 such as alumina is formed.

Figure 5K:
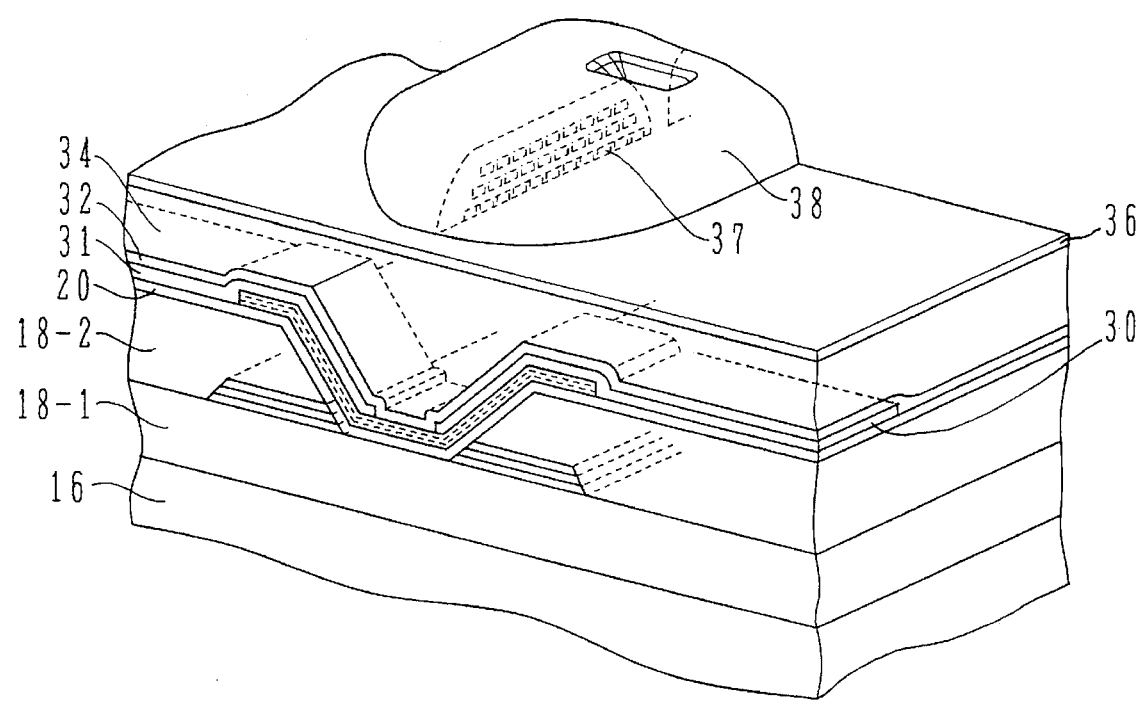

As shown in FIG. 5K, a coil 37 and an insulating layer 38 is formed. For example, a coil layer is deposited and patterned, an insulating layer is deposited on the coil layer, and an opening is formed in the insulating layer at the contact area. Similarly, another coil layer is deposited and patterned, an insulating layer is deposited on the coil layer, and an opening is formed in the insulating layer at the contact area. In this manner, a desired number of coil layers are formed.

Figure 5L:
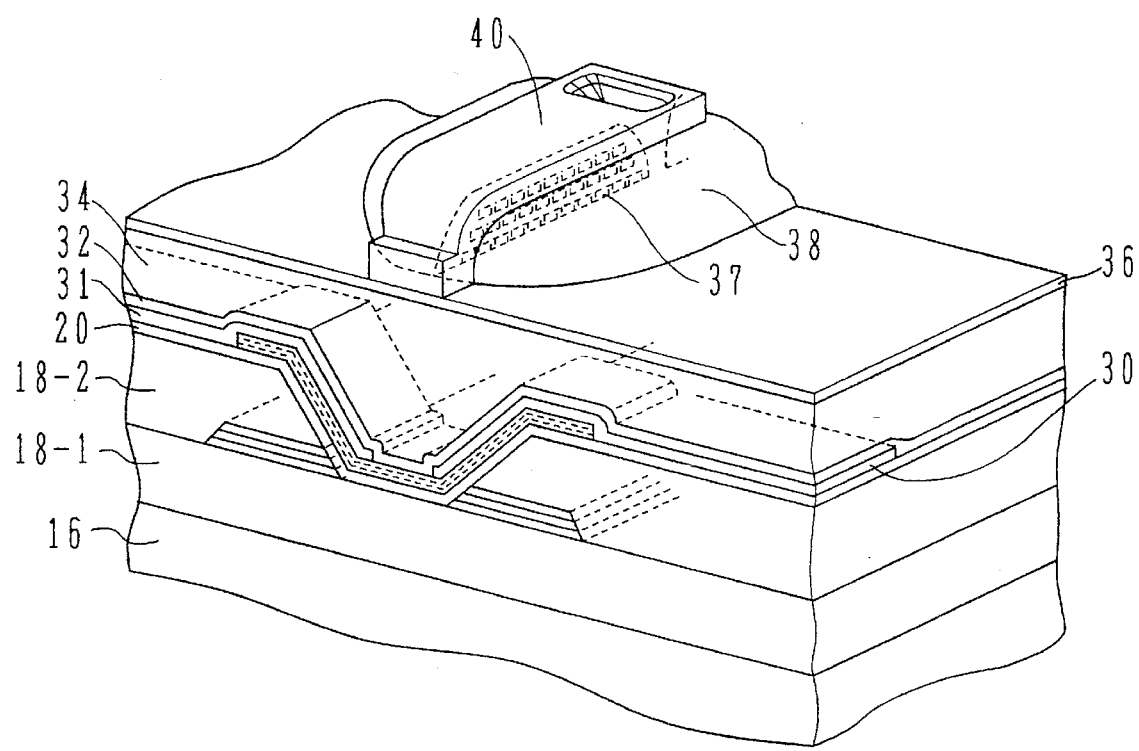

As shown in FIG. 5L, an upper core 40 is formed riding over the coil 37 and insulating layer 38 to form a write head (induction type magnetic head) 14. With the above processes, an induction-MR type composite magnetic head such as shown in FIGS. 1A and 1B is formed.

In the above embodiment, an MR head of an SAL bias type has been described. It is however obvious that the invention is applicable to MR heads of other types. As shown in FIG. 4A, the side-lobe can be reduced by lowering the sensitivity of the MR film under the leads. This invention is also applicable to MR heads for disks other than a hard disk.

The present invention has been described in connection with the preferred embodiments. The invention is not limited only to the above embodiments. It is apparent to those skilled in the art that various modifications, improvements, combinations and the like can be made without departing from the scope of the appended claims.

We claim:

1. A magneto-resistance type head which is divided into an active region for detecting a magnetic field and inactive regions not contributing to the detection of the magnetic field, the magnetic-resistance type head comprising:
   - a base and a magnetic shield formed on the base, said magnetic shield having upper flat portions, slanted surfaces provided between the upper flat portions, and a lower flat portion provided between the slanted surfaces so as to define a recess, the magnetic shield comprising a lower magnetic shield sub-layer and an upper magnetic shield sub-layer formed on the lower magnetic shield sub-layer, and said recess being formed in the upper magnetic shield sub-layer;
   - a magneto-resistance material layer conformally formed over the magnetic shield;
   - a first spacer layer formed in the inactive regions and on the lower magnetic shield sub-layer;
   - a longitudinal bias means formed on the first spacer layer; and
   - a second spacer layer formed on the longitudinal bias means.

2. A magneto-resistance type head according to claim 1, wherein the first spacer layer and the second spacer layer comprise aluminum oxide.

3. A magneto-resistance type head according to claim 1, wherein the longitudinal bias means is made of a permanent magnet.

4. A magneto-resistance type head according to claim 1, further comprising:
   - a gap layer formed on the upper magnetic shield sub-layer;
   - a third spacer layer formed over the magneto-resistance layer; and
   - a transverse bias means formed on the third spacer layer.

5. A magneto-resistance type head according to claim 4, wherein the gap layer, the third spacer layer, and the transverse bias means have upper flat portions and slanted portions in said inactive regions, and a lower flat portion in said active region.

6. A magneto-resistance type head according to claim 5, further comprising:
   - a pair of leads formed on the inactive regions and being partially held in contact with the transverse bias means;
   - an upper gap formed on the leads; and
   - another magnetic shield formed on the upper gap layer.

7. A magneto-resistance type head according to claim 4, wherein the gap layer is made of aluminum oxide and the third spacer layer is made of Ti.

8. A magneto-resistance type head according to claim 4, wherein the transverse bias means comprises soft magnetic material selected from a group consisting of CoZrNb and CoZrMo.

9. A magneto-resistance type head according to claim 1, wherein the magneto-resistance material layer comprises NiFe alloy.

10. A magneto-resistance type head according to claim 1, wherein the magnetic shield recess has an inverted trapezoid shape in its cross section, the inverted trapezoid shape being defined by said slanted surfaces.

11. A magneto-resistance type head according to claim 1, wherein the base comprises $Al_2O_3$—TiC.

* * * * *